United States Patent
Amesbury et al.

[15] 3,680,461
[45] Aug. 1, 1972

[54] STEP-AND-REPEAT CAMERA HAVING AN IMPROVED FILM INDEXING MEANS

[72] Inventors: Maurice G. Amesbury, Diamond Bar; Jacobus Van Vonderen, Covina, both of Calif.

[73] Assignee: Teledyne, Inc., Los Angeles, Calif.

[22] Filed: March 1, 1971

[21] Appl. No.: 119,467

[52] U.S. Cl. ..........................95/37, 355/53, 355/54, 355/95
[51] Int. Cl. ......................G03b 17/30, G03b 19/04
[58] Field of Search ............... 95/37; 355/53, 54, 95

[56] References Cited

UNITED STATES PATENTS 3,261,259  7/1966  Baptie et al......................95/37

*Primary Examiner*—Samuel S. Matthews
*Assistant Examiner*—Russell E. Adams, Jr.
*Attorney*—Ralph Ronald W. Reagin, Ralph M. Braunstein, Stephen L. King and Kenneth W. Mateer

[57] ABSTRACT

A step-and-repeat camera is disclosed which includes a film support frame for supporting film in a focal plane and a suitable lens for focusing an image to be photographed onto an exposure frame in the focal plane. A drive means including a resilient member is provided for moving the film support frame laterally relative to the lens and an indexing means is provided for securing the film support frame in a plurality of discrete lateral positions relative to the lens. Control means are provided which are responsive to deflections in the resilient member to deenergize the device means whenever the film support frame is in one of the discrete lateral positions.

14 Claims, 6 Drawing Figures

Fig. 1
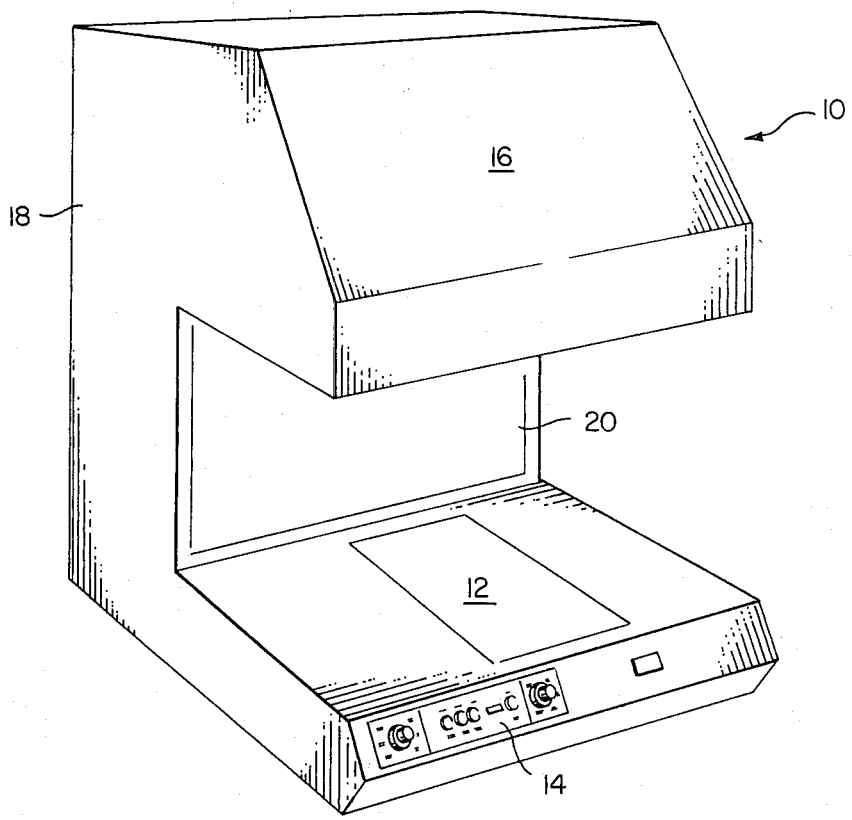
Fig. 5
Fig. 6
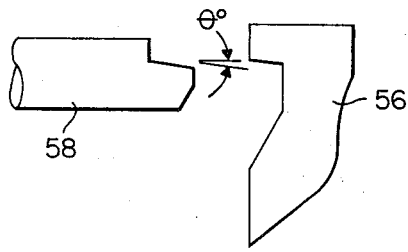
JACOBUS VAN VONDEREN
MAURICE G. AMESBURY
INVENTORS
BY *Ronald W. ...*
ATTORNEY

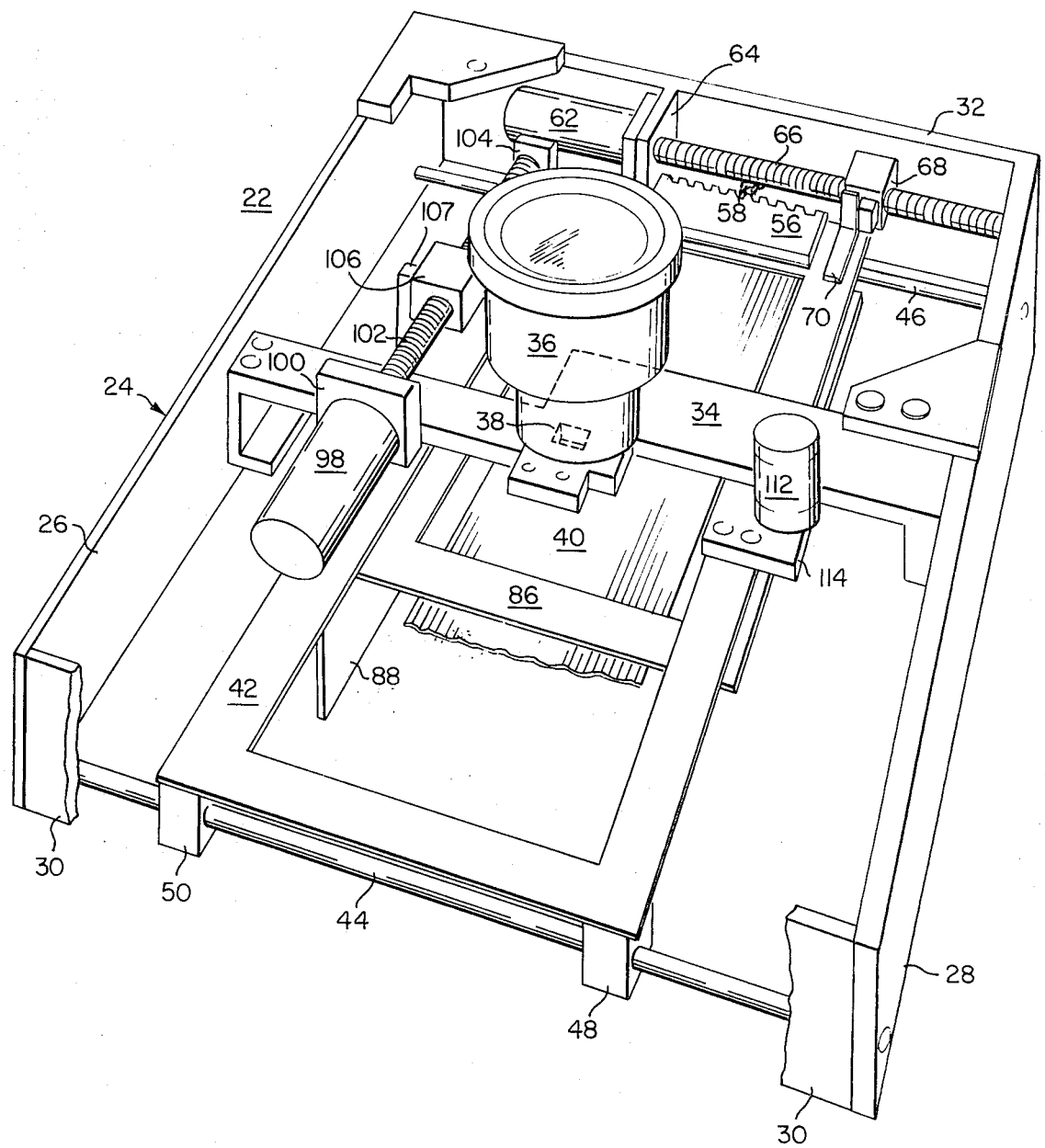

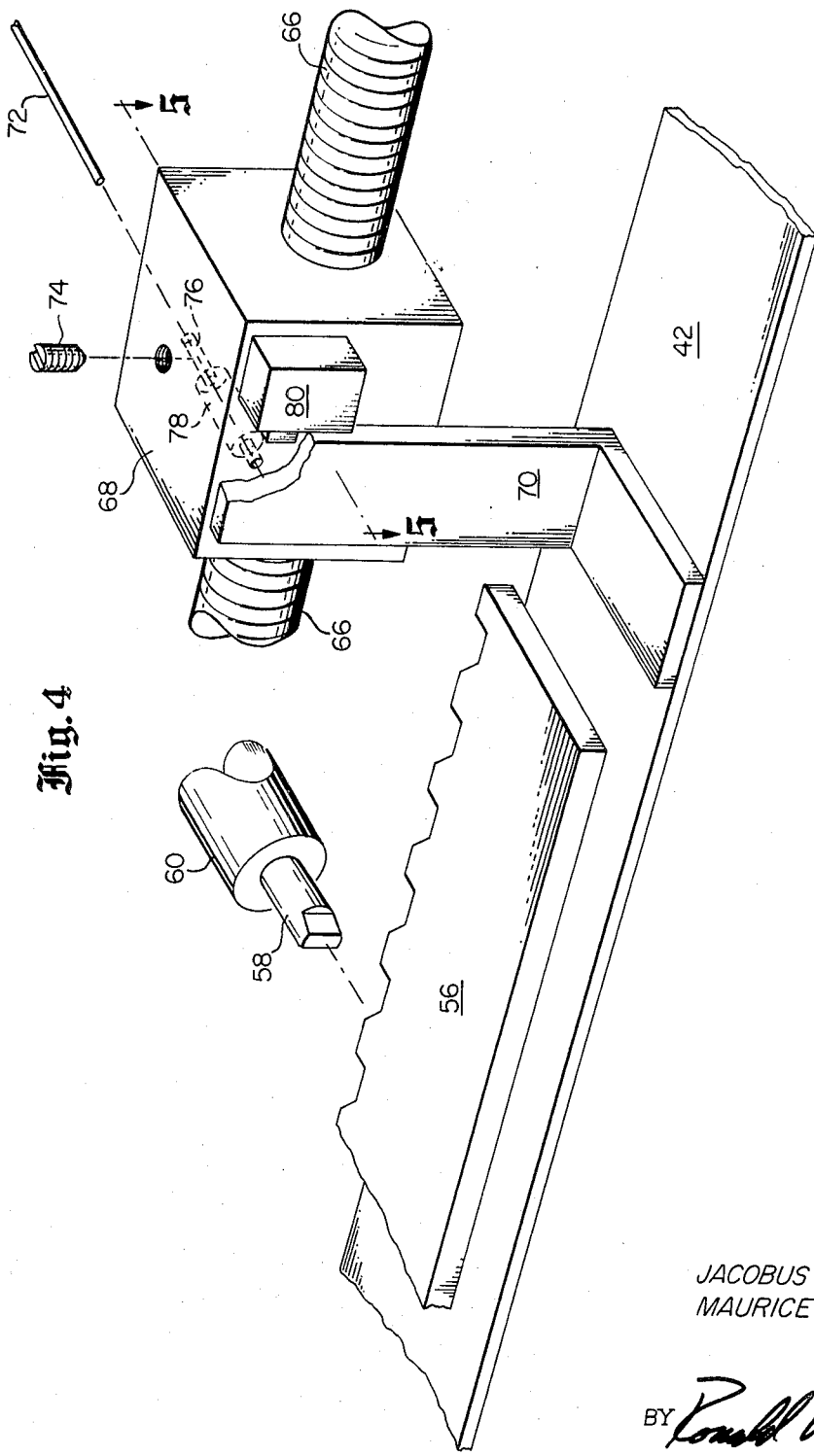

STEP-AND-REPEAT CAMERA HAVING AN IMPROVED FILM INDEXING MEANS

This invention relates to camera systems and more particularly to an improved film indexing means for a step-and-repeat camera.

A step-and-repeat camera is a camera in which a plurality of images are photographed onto a single piece of film, with each image being photographed onto a respective discrete portion of the film. Typically, such cameras are used to store large amounts of information in a very limited space or volume. For example, each page of a book or a lengthy document is photographed onto sequential adjacent discrete portions or exposure frames of the film. The resultant film is sometimes known as microfilm or microfiche.

A typical step-and-repeat camera uses high resolution fine grain film whose width is suitably wide so that a predetermined plurality of images or exposure frames can be placed in a row across the width of the film. The film is usually supported on a movable frame which is mounted beneath a fixed lens system which focuses an image from the document being photographed onto a discrete exposure frame on the film. After the film is exposed and a new document or next page of the document is placed in position for photographing, the frame supporting the film is automatically shifted or indexed one position laterally so that a fresh unexposed portion of film is brought to the focal point of the lens and the shutter is then actuated to expose the new portion of the film to the new document being photographed. Typically, such cameras are automated so that an operator need merely place the new document in the proper location in the machine and then actuate a single control which automatically operates the shutter in the lens system and then steps the frame to the next position. This sequence is repeated for such frame across the width of the film, and thus the cameras are called step-and-repeat cameras.

After a complete row of frames has been exposed in this manner, the camera usually provides some means for automatically returning the film support frame to its original position so that the first frame in the row is once again under the lens and for automatically indexing the film one position longitudinally so that another row is now ready for exposure under the lens. This longitudinal indexing can be effected in either of two ways. In some step-and-repeat cameras, the film is merely advanced a suitable length along its path of travel from its supply reel or cassette to its take-up reel so that a new row of film is presented under the lens. In other step-and-repeat cameras which require greater accuracy of indexing, the film support frame is also indexed in the longitudinal direction in a similar manner to its lateral indexing so that the entire frame is stepped longitudinally while the film is held stationary relative to the frame. In such step-and-repeat cameras, after the exposure of each frame at the end of each row, the film support frame is automatically returned in the lateral direction to its first exposure position and simultaneously the frame is indexed one position longitudinally. This sequence is continued until the exposure of the last frame in the last row, at which time the frame is automatically returned to its starting position at the first frame in the first row, and an entire length of film is then metered from the supply reel to the take-up reel.

A number of different arrangements have been proposed in the prior art for indexing the film support frame relative to the lens, none of which have proven to be entirely satisfactory. One of the earliest proposals was to provide a rack having a predetermined number of spaced notches along it carried either on the camera body or on the film support frame and to have a controllable pawl carried on the other of the body or the frame. In such cameras, when the pawl engages the rack, the film support frame is held securely and when it is desired to index the film support frame, the pawl is disengaged from the rack and the frame is driven by a suitable motor to a new position, at which time the pawl again engages the rack. In practice, it was discovered that with this type of arrangement, the pawl did not hold the rack sufficiently secure to provide sufficiently accurate imaging of the material being photographed onto the film.

Another mechanism utilized in the prior art to index the frame is to provide a threaded drive shaft having a follower nut thereon which drives the film support frame. Suitable means are provided to sense the location of the film support frame at any given instant and to use a signal derived therefrom as a servo signal to control the motor driving the threaded drive shaft. Systems such as this may be made quite accurate if suitably precise position sensing means and servo mechanisms are employed. However, when such suitably precise components are used, the cameras prove to be quite expensive.

Numerous other arrangements for indexing the film support frame have been proposed in the prior art, such as providing cam and cam follower drive systems and the like, but all of the systems proposed in the prior art have proven to be either quite expensive or not sufficiently accurate.

It is accordingly an object of the present invention to provide an improved step-and-repeat camera.

It is yet another object of the present invention to provide an improved drive mechanism for the film support frame of a step-and-repeat camera.

It is still another object of the present invention to provide an improved drive mechanism for the film support frame of the step and repeat camera which positions the film support frame with a high degree of accuracy and which can be produced at a moderate cost.

Briefly stated, and in accordance with the presently preferred embodiment of this invention, a step-and-repeat camera is provided which includes a film support frame for supporting film in a focal plane and a suitable lens for focusing an image to be photographed onto an exposure frame in the focal plane. A drive means including a resilient member is provided for moving the film support frame laterally relative to the lens and an indexing means is provided for securing the film support frame in a plurality of discrete lateral positions relative to the lens. Control means are provided which are responsive to deflections in the resilient member to deenergize the drive means whenever the film support frame is in one of the discrete lateral positions.

A complete understanding of the invention may be obtained from the following detailed description of the attached drawings, in which:

FIG. 1 shows a perspective view of a step-and-repeat camera in accordance with the invention;

FIGS. 2 and 3 show perspective views of a portion of the internal mechanism of the camera of FIG. 1;

FIG. 4 shows a detail of a portion of FIG. 2;

FIG. 5 is a sectional view along the lines 5—5 of FIG. 4; and

FIG. 6 is a detailed view of the rack and pawl of FIG. 4.

Figure 3:
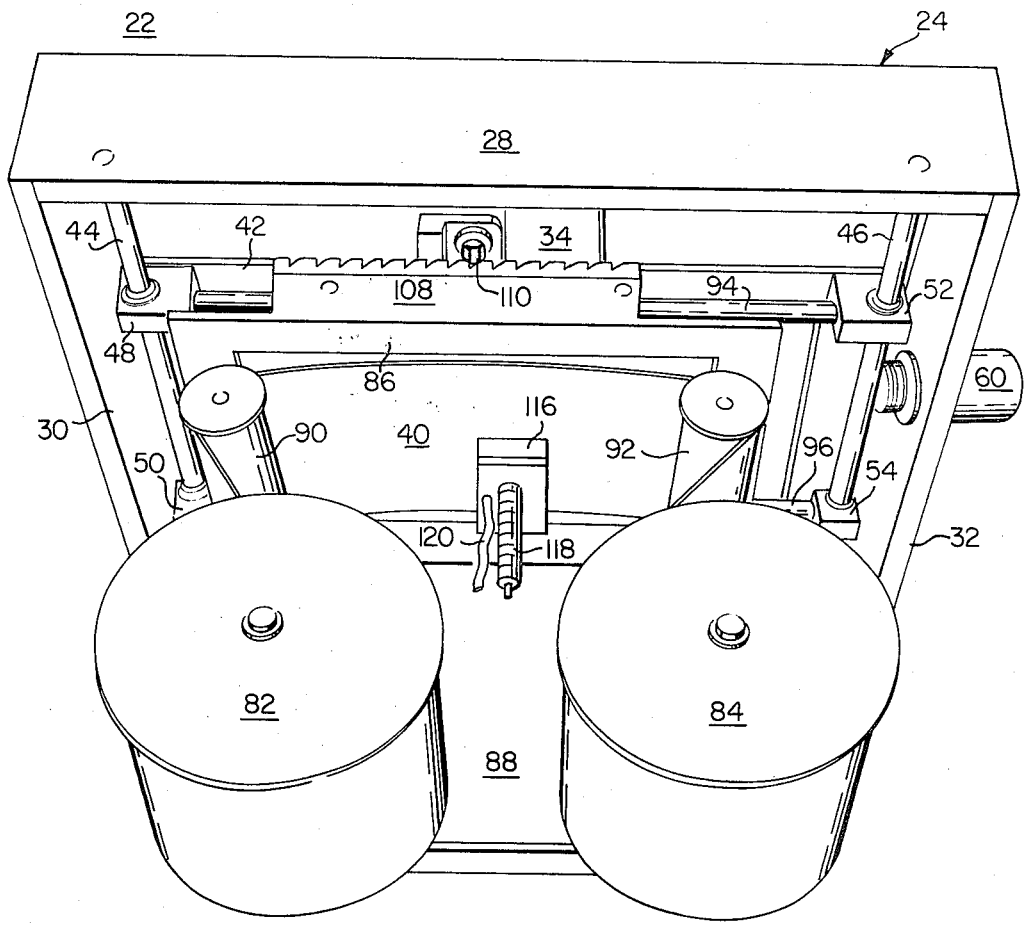

FIG. 1 shows a perspective view of the exterior of a step-and-repeat camera 10 in accordance with the present invention. In the camera 10 a document to be copied is placed on the base 12 and an operator actuates the controls 14, such as by pressing one of the buttons therein. This causes suitable lights (not shown in FIG. 1) to be energized in the overhanging portion 16 of the camera 10 to illuminate the document on the base 12. Suitable mirrors within the overhanging portion 16 and upper rear portion 18 of camera 10 reflect light from the document on the base 12 down into the copying unit located in the lower rear portion 20 of camera 10. Details of the copying unit located in the lower rear portion 20 are shown and described in FIGS. 2 through 6 below. Further details of the lights, the mirrors, the controls and the like are not shown, since these elements per se form no part of the present invention and their operation and structure is well known to those skilled in the art.

FIGS. 2 and 3 show perspective views of the copying unit 22 which is positioned in the lower rear housing 20 of the step-and-repeat camera 10 of FIG. 1. FIG. 2 is taken from the upper left side of unit 22, and FIG. 3 is taken from the lower front of unit 22. In the two figures, the same reference numerals are used to designate the same parts, and the following description describes both views simultaneously.

The unit 22 includes a rectangular support member 24 which is securely mounted within the housing 20 of step-and-repeat camera 10. The support member 24 is formed from a rear member 26, a front member 28, a left side member 30 and a right side member 32. In order to show details of the structure, FIG. 2 shows a portion of the left side member 30 broken away.

A lens support bracket 34 is mounted between the rear member 26 and front member 28 of support member 24. A suitable lens structure 36 is mounted on lens support bracket 34. It is noted that the lens 36 in FIG. 2 is shown facing upward, since, as was described above in connection with FIG. 1, the mirrors in the upper portion of camera 10 reflect light from a document being copied downwardly into the lower rear housing 20 of camera 10 where the unit 22 is mounted.

Lens 36, which may be any suitable lens system such as are well known to those skilled in the camera art, focuses the light reflected from the document down through an aperture 38 in lens support bracket 34 onto a high resolution low grain photographic film 40, where the image from the document being copied is recorded. The portion of bracket 34 around the aperture 38 thus forms an aperture plate which defines the boundaries of the discrete portion of the film 40 which is being exposed at any given operation of camera 10. This discrete portion of film may be termed an exposure frame of film.

As was discussed above, a step-and-repeat camera photographs a series of images in a plurality of exposure frames in a row laterally across film 40. In the unit 22 shown in FIGS. 2 and 3, this is effected by supporting the lens 36 in a stationary position as shown and stepping the mechanism supporting the film 40 laterally relative to lens 36 through a plurality of steps equal in number to the number of exposure frames to be exposed in each row across film 40. In the mechanism of FIGS. 2 and 3, film 40 is eventually supported from a lateral stepping film support frame 42. Frame 42 is mounted to slide on rods 44 and 46 which are in turn supported at their ends by the members 26 and 28 of support member 24. Frame 42 is slideably supported on rod 44 through the bearing members 48 and 50 and upon rod 46 through the bearing members 52 and 54.

A lateral indexing rack 56 is provided which is secured to frame 42, as shown in FIG. 2. The steps of indexing rack 56 engage a pawl 58, which is connected to the armature of a solenoid 60 mounted on the right side member 32 of support member 24. When the pawl 58 engages one of the steps of rack 56, frame 42 is securely held in a fixed position relative to lens 36. A suitable discrete portion of the film 40 is then positioned beneath the aperture 38 to be exposed as an exposure frame in a lateral row of such exposure frames across film 40. When it is desired to step the camera to bring the next exposure frame in film 40 under aperture 38, the solenoid 60 is energized and the pawl 58 disengages the step in lateral indexing rack 56. At this time, as explained in more detail in the description of FIGS. 4 and 5 below, a lateral stepping motor 62 which is mounted on a support bracket 64 to right side member 32 is energized. Motor 62 turns a threaded shaft 66 whose other end is supported in a suitable bearing by front member 28. A follower nut 68 is provided on threaded shaft 66. Nut 68 is secured to a resilient member (not shown in FIGS. 2 and 3). As is shown in FIG. 4 below, this resilient member is secured to an arm 70 the other end of which is secured to frame 42. Thus, when motor 62 is energized and rotates threaded shaft 66, the nut 68 moves laterally along threaded shaft 66, and in so doing drives frame 42 laterally along its support rods 44 and 46. As is also described in more detail in connection with the description of FIGS. 4 and 5 below, when the pawl 58 engages the next step on indexing rack 56, motor 62 is then deenergized and a new portion of film 40 is now positioned under aperture 38 to be exposed as the next exposure frame along the lateral row.

FIG. 4 is a partially exploded perspective view of a portion of FIG. 2 and illustrates how the frame 42 is secured in position by the pawl 58, how the frame 42 is driven and stepped when the pawl 58 is disengaged from the rack 56 and how the motor 62 (not shown in FIG. 4) is controlled. As is shown in FIG. 4, the arm 70 is not secured directly to the nut 68, but rather is attached to nut 68 through a resilient member 72, which may conveniently be formed from a suitable length of a proper grade of piano wire. One end of resilient member 72 is connected to the arm 70 and the other end is secured to the nut 68 by a set-screw 74 which engages the resilient member 72 when it passes through the first section 76 of an opening in nut 68 which has a diameter substantially equal to or slightly larger than the diameter of resilient member 72. Between the hole 76 and the arm 70, resilient member 72 passes through a record section 78 of the opening which is a cavity whose diameter is substantially larger than the diameter of resilient member 72.

Also carried on nut 68 is a normally closed microswitch 80 which is electrically connected in series between the motor 62 and its power source. The operation of this portion of the invention may be better understood from an examination of FIG. 5, which is a sectional view taken along the lines 5—5 of FIG. 4. Now, consider the structures shown in FIGS. 4 and 5 and assume that solenoid 60 is energized so that pawl 58 is disengaged from rack 56 and assume that motor 62 is energized, thereby rotating threaded shaft 66. Shaft 66 is threaded in such a way and motor 62 turns in such a direction that the nut 68 is moved in the direction towards the left in FIG. 4. This movement of nut 68 is transmitted to frame 42 through the resilient member 72 and the arm 70, and frame 42 is thus moved laterally to the left in FIG. 4.

Solenoid 60 is normally energized only for a short period of time long enough to allow the adjacent step of rack 56 to clear the end of pawl 58, at which time solenoid 60 is deenergized and pawl 58 again falls into contact with rack 56. Pawl 58 then engages the next step in rack 56 and then stops the lateral movement of frame 42. However, at this time motor 62 is still energized and threaded shaft 66 continues rotating and thus driving nut 68 towards the left in FIG. 4. As this occurs, the resilient member 72 deflects in the cavity 78 in nut 68, since the arm 70 secured to the other end of resilient member 72 is being held stationary by frame 42, and this deflection continues until the arm 70 engages the microswitch 80 and trips it, thereby deenergizing motor 62 and stopping the rotation of shaft 66.

In FIG. 5 the solid lines show the normal position of resilient member 72 in cavity 78 and of the arm 70. The dotted lines show the position of resilient member 72 and the arm 70 when the frame 42 is secured in discrete lateral position by the pawl 58 engaging rack 56 and when nut 68 has attempted to move further down threaded shaft 66, thereby deflecting resilient member 72 and causing arm 70 to engage and trip microswitch 80 to deenergize motor 62.

Thereafter, should frame 42 for any reason shift laterally back away from pawl 58, and thus away from its desired position, resilient member 72 is returned to its normal position and arm 70 no longer engages microswitch 80. Thus, motor 62 is again automatically energized to drive frame 42 back to its proper position, at which time arm 70 again trips microswitch 80 to deenergize motor 62. Thus, frame 42 is retained in its desired position automatically without the need of any further control circuitry or position sensing elements.

FIG. 6 shows a detail view of the rack 56 and the pawl 58. As is shown therein, the stepped surface of rack 56 and the corresponding engaging surface of pawl 58 are not exactly perpendicular to frame 42, but are instead displaced at a slight angle $\theta$ away from perpendicular to the frame 42. In practice, it has been found most desirable to make the value of the angle $\theta$ about 4°. By so providing this angularly offset surface, it has been found that considerably less power is needed from solenoid 60 to disengage the pawl from the rack, since pawl 58 is now more quickly disengaged from the surface of rack 56, and thus frictional engagement between the two is minimized. This enables solenoid 60 to be a smaller, and thus less expensive unit.

At this point, it would be well to summarize the operation of the device as described thus far in order to appreciate some of the advantages of the present invention. As was mentioned above, when an operator desires to copy a document, the document is placed in a suitable provided position and the operator actuates the control, which may be a single push button. When the button is pushed, the lights are energized and the shutter mechanism in the lens is operated to expose the desired portion of film 40. After exposure of the film, solenoid 60 is automatically energized for a short period of time to disengage pawl 58 from rack 56. When this happens, the natural spring action in resilient member 72 moves frame 42 laterally a sufficient amount to cause arm 70 to no longer engage microswitch 80, at which time the motor 62 is energized through microswitch 80 to continue the driving action for frame 42. When solenoid 60 is deenergized, pawl 58 engages the next stepped surface in rack 56 to stop frame 42 in the next desired position after it has been stepped or indexed one unit laterally after the exposure. As was described above, the shown arrangement provides positive means for assuring that frame 42 is the maintained in this desired position without the need for further control circuits or position sensing elements. Thus, the invention provides extremely accurate indexing and positioning while using only a small number of simple and inexpensive components.

After all of the exposure frames in a lateral row across film 40 are exposed, frame 42 is returned back to its first lateral position relative to aperture 38 and some means must be provided for advancing film 40 longitudinally one step relative to aperture 38 in order that the next lateral row of exposure frames may be exposed. As was mentioned above, in some instances sufficient accuracy in this longitudinal stepping of film 40 may be provided simply by advancing the film a suitable amount from the supply cassette 82 to the take-up cassette 84. However, for many precise applications, it is not practical to control the film metering portion of the device with sufficient accuracy, and accordingly in these applications some means must be provided for stepping the entire film support apparatus longitudinally as well as laterally. Accordingly, the embodiment of the invention shown in FIGS. 2 and 3 includes longitudinal stepping means essentially identical to the lateral stepping means described above.

As is shown in FIGS. 2 and 3, a second film support frame 86, which may be termed the longitudinal stepping film support frame, is provided which is similar in structure and function to the lateral stepping film support frame 42 previously described. A plate 88 is supported from the back of support frame 86 and, as is shown best in FIG. 3, the supply and take-up cassettes 82 and 84 and the rollers 90 and 92 which support the film 40 are attached to this plate 88. For clarity, the film 40 is shown broken off in FIG. 2 and the roller 90 and the supply cassette 82 are not shown.

No further details of the film transport and support system per se are shown in FIGS. 2 and 3, since these details form no part of the present invention. A suitable film transport and support system which may be used with the present invention is shown and described in co-pending application Ser. No. 119,468, filed concurrently with this application by Jacobus Von Vanderen and assigned to the assignee of this application.

Continuing the description of the longitudinal stepping mechanism of FIGS. 2 and 3, support frame 86 is slidably mounted on rods 94 and 96. Rod 94 is supported from frame 42 by having its ends secured to bearing members 48 and 52 and rod 96 is similarly supported from frame 42 by having its ends secured to bearing members 50 and 54. Thus, whenever frame 42 is stepped laterally, frame 86 which is actually supporting film 40 is also stepped laterally, but frame 86 is independently movable longitudinally relative to frame 42.

Frame 86 is driven by a longitudinal stepping motor 98 which is similar to the motor 62 which drives frame 42. Motor 98 is supported on a bracket 100 which is secured to frame 42 and drives a threaded shaft 102 whose other end is supported in a bearing 104 which is also secured to frame 42. A follower nut 106 similar in structure and function to the nut 68 described in detail at FIGS. 4 and 5 above is provided on threaded shaft 102. Nut 106 drives frame 86 longitudinally through an arm 107 similarly in structure and function to the arm 70 previously described.

A longitudinal indexing rack 108 is provided which is secured to frame 86, as is best shown in FIG. 3. A pawl 110 engages the steps in rack 108 to hold frame 86 securely in a desired longitudinal position. Pawl 110 is connected to the armature of a solenoid 112 which is supported on a bracket 114 which is secured to frame 42.

The means for driving frame 86 longitudinally relative to frame 42 and for securing frame 86 in a desired longitudinal position relative to frame 42 are identical to the means previously described in detail above for driving frame 42 laterally relative to support member 24 and for securing frame 42 in a desired lateral position relative to support frame 24, so accordingly the description of operation of the of the longitudinal drive and securing mechanism is not repeated.

FIG. 3 also shows a platen 116 which is positioned on the lower side of film 40 directly under the aperture 38. The platen 116 is supported from a solenoid 118 which is secured to support member 24 in any suitable manner (not shown in FIG. 3). When the frames 42 and 86 are properly positioned to provide the desired exposure frame in film 40 under aperture 38 and it is desired to operate camera 10 to expose this portion of the film, the solenoid 118 is energized to cause the platen 116 to raise upwardly against film 40 to hold it securely in position under aperture 38. If desired, the surface of platen 116 which engages film 40 can be provided with a plurality of orifices which are connected through a flexible tubing 120 to a source of partial vacuum such as a vacuum pump to hold the film 40 even more securely against platen 116 when an exposure is being made.

The mechanism of the present invention has now been described in detail. Also, several portions of the operating sequence have earlier been described to facilitate a full understanding of the mechanism. It is now appropriate to consider the entire operating cycle of the camera.

As is seen below, the previous operation of the camera ended with a fresh unexposed portion of film 40 under aperture 38. When an operator desires to make another exposure, the document being copied is placed on the base 12 of camera 10 and the suitable control mechanism 14 is actuated by the operator. This energizes the lights, energizes solenoid 118 to bring platen 116 up against film 40 and energizes the vacuum pump attached to tubing 120 to assure that the exposure frame of film 40 under aperture 38 is held flat and stationary during exposure. The shutter mechanism of lens 36 is then operated to complete the exposure. After exposure is completed, the lights are deenergized and solenoid 118 is deenergized to allow platen 116 to return to its stationary position spaced from film 40. At this time, solenoid 60 is energized to cause frame 42 to move one step laterally in the manner described above to bring a fresh unexposed portion of film under aperture 38.

If the exposure frame which was just exposed was the final frame in a lateral row of such frames, suitable sensing means, such as a limit switch (not shown) indicates that the row of exposure frames has been completed and suitable control circuits again energize solenoid 60 to withdraw pawl 58 from lateral indexing rack 56. Motor 62 is now energized to operate in its opposite direction to return frame 42 to its initial lateral position such that the first exposure frame in a row is now under aperture 38. Simultaneously, solenoid 112 is energized to cause frame 86 to step one row longitudinally relative to frame 42, thereby bringing the next row of exposure frames in film 40 into lateral alignment with aperture 38. Thus, the combined effect is to bring the first exposure frame of the next lateral row under aperture 38.

If the exposure frame which was just exposed was the last exposure frame in the last lateral row under frame 86, solenoid 112 is energized to withdraw pawl 110 from longitudinal indexing rack 108 and motor 98 is energized to rotate in the opposite direction to return frame 86 to its initial longitudinal position relative to frame 42. In this event, the combined effect of energizing the solenoids 60 and 112 and the motors 62 and 98 is to return both frames 42 and 86 to their initial positions such that the first exposure frame in the first lateral row is now under aperture 38. Simultaneously with this operation, the film 40 is advanced one pitch length from supply cassette 82 to take-up cassette 84 to bring an entire unexposed section of film under frame 86. The mechanism is now ready to expose another matrix of lateral rows and longitudinal columns of exposure frames on film 40.

It is thus seen that regardless of what exposure frame in the matrix was last exposed, the mechanism shown and described automatically brings the next proper exposure frame under aperture 38.

No details of the limit switches or control circuits for returning frames 42 or 86 to their initial positions are shown in FIGS. 2 and 3, since such switches and circuits are well known to those skilled in the art and form no part per se of the present invention.

While the invention is thus disclosed and a specific embodiment thereof described in detail, it is not intended that the invention be limited to this shown embodiment. Instead, many modifications will occur to those skilled in the art which lie within the spirit and scope of the invention. For example, the positions of the indexing racks and their respective pawls could easily be reversed, and the invention would still function in the same manner. It is thus intended that the invention be limited in scope only by the appended claims.

What is claimed is:

1. A step-and-repeat camera comprising, in combination:
    a housing,
    support means for supporting film in a focal plane,
    a lens for focusing an image to be photographed into an exposure frame in said focal plane,
    indexing means for securing said support means in a plurality of discrete lateral positions relative to said lens,
    controllable drive means including a motor secured to said housing, a movable member driven by said motor, and a resilient member, said resilient member having a first end secured to said movable member and a second end secured to said first frame, whereby said resilient member deflects from its normal position to a deflected position whenever said first frame is secured in one of said discrete positions and said motor drives said movable member, and
    control means responsive to said resilient member for deenergizing said drive means whenever said support means is in one of said discrete lateral positions.

2. The camera of claim 1 in which said lens is secured to said housing and said support means comprises a first frame movably mounted in said housing.

3. The camera of claim 2 in which said control means comprises a normally closed switch in series with said motor which is tripped to an open position whenever said resilient member is in its deflected position.

4. The camera of claim 3 in which said movable member comprises a threaded shaft and a follower nut and in which said threaded shaft is rotatably driven by said motor.

5. The camera of claim 4 in which said resilient member comprises a wire element having a first and second end, said nut includes an opening therethrough having a first section whose diameter is substantially equal to the diameter of said wire and having a second section whose diameter is substantially larger than the diameter of said wire, and in which said first end of said wire is secured in said first section of said opening and said second end of said wire is secured to said first frame beyond said second section of said opening.

6. The camera of claim 5 in which said indexing means comprises an indexing rack having a plurality of steps therein secured to one of said first frame and said housing and a pawl secured to the other of said first frame and said housing for controllably engaging said steps to secure said first frame in a desired one of said positions along said first direction.

7. The camera of claim 6 in which said rack is secured to said first frame and which further comprises a solenoid for controllably moving said pawl out of and into engagement with said steps in said rack.

8. The camera of claim 7 which further comprises:
    a second frame slideably mounted on said first frame for movement in a longitudinal direction relative to said lens, which longitudinal direction is substantially perpendicular to said lateral direction,
    a second motor secured to said first frame for moving said second frame in said longitudinal direction,
    a second threaded rod and follower nut, said second threaded rod being rotatably driven by said second motor,
    a second resilient member connected to said second frame from said second nut,
    a second indexing rack having a plurality of steps therein secured to said second frame,
    a second movable pawl secured to said first frame for engaging the steps in said second rack to secure said second frame in a plurality of discrete longitudinal positions relative to said first frame,
    a second solenoid for controllably moving said second pawl out of and into engagement with said steps in said second rack, and
    a second normally closed switch responsive to said second resilient member for deenergizing said second motor whenever said second frame is in one of said discrete longitudinal positions.

9. The camera of claim 8 in which the surfaces which form steps in said rack and the surface of said pawl engaging said steps each forms a non-perpendicular angle with said lateral direction and the surfaces which form said steps in said second rack and the surface of said second pawl engaging said steps each forms a non-perpendicular angle with said longitudinal direction.

10. The camera of claim 9 which further comprises means for transporting film relative to said second frame in a direction parallel to said longitudinal direction.

11. The camera of claim 10 which further comprises an aperture plate the boundary of whose aperture defines said exposure frame.

12. The camera of claim 11 which further comprises:
    a platen,
    means for mounting said platen on said housing adjacent to said aperture plate but on the opposite side of the film in said camera than is said aperture plate, and
    controllable means for moving said platen towards said aperture plate to secure said film against said aperture plate.

13. The camera of claim 12 in which said controllable means is a third solenoid.

14. The camera of claim 13 which further includes orifices in the surface of said platen and means for connecting said orifices to a partial vacuum to hold said film flat against said platen.

* * * * *